United States Patent
Nakayama

(10) Patent No.: US 11,988,648 B2
(45) Date of Patent: May 21, 2024

(54) LIQUID CHROMATOGRAPH

(71) Applicant: Shimadzu Corporation, Kyoto (JP)

(72) Inventor: Daisuke Nakayama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 582 days.

(21) Appl. No.: 16/760,632

(22) PCT Filed: Jul. 25, 2018

(86) PCT No.: PCT/JP2018/027880
§ 371 (c)(1),
(2) Date: Apr. 30, 2020

(87) PCT Pub. No.: WO2019/111438
PCT Pub. Date: Jun. 13, 2019

(65) Prior Publication Data
US 2020/0348270 A1    Nov. 5, 2020

(30) Foreign Application Priority Data
Dec. 4, 2017 (JP) .................. 2017-232579

(51) Int. Cl.
*G01N 30/24* (2006.01)
*G01N 30/34* (2006.01)
*G01N 30/02* (2006.01)

(52) U.S. Cl.
CPC ............. *G01N 30/24* (2013.01); *G01N 30/34* (2013.01); *G01N 2030/027* (2013.01)

(58) Field of Classification Search
CPC ........ G01N 30/24; G01N 30/34; G01N 30/20; G01N 2030/027; G01N 2030/347; G01N 2030/27
See application file for complete search history.

(56) References Cited

U.S. PATENT DOCUMENTS

| 2006/0193748 A1 * | 8/2006 | Tai ..................... | G01N 30/7266 250/281 |
| 2010/0330690 A1 * | 12/2010 | Kimoto ................ | G01N 1/2205 436/163 |
| 2018/0284079 A1 * | 10/2018 | Yasunaga .............. | G01N 30/20 |

FOREIGN PATENT DOCUMENTS

| EP | 2703808 A1 * | 3/2014 | ............ G01N 30/20 |
| JP | 4652895 B2 * | 3/2011 | |

OTHER PUBLICATIONS

International Search Report for PCT application No. PCT/JP2018/027880, dated Oct. 23, 2018, submitted with a machine translation.

* cited by examiner

*Primary Examiner* — David Z Huang
(74) *Attorney, Agent, or Firm* — Muir Patent Law, PLLC

(57) ABSTRACT

A liquid chromatograph includes: a feeding unit configured to feed a mobile phase prepared for an analysis; an analysis flow path provided with an analytical column for separating a sample and a detector for detecting sample components separated with the analytical column; a sample injection part configured to inject the sample into the analysis flow path; a measurement flow path provided separately from the analysis flow path and provided with a measuring instrument for measuring a preparation state of the mobile phase; and a status switching unit configured to selectively switch between an analysis state in which all of the mobile phase the from feeding unit flows through the analysis flow path and a measurement state in which at least a part of the mobile phase from the feeding unit flows through the measurement flow path.

9 Claims, 8 Drawing Sheets

LIQUID CHROMATOGRAPH

TECHNICAL FIELD

The present invention relates to a liquid chromatograph for performing a separation analysis of a sample using an analytical column.

BACKGROUND OF THE INVENTION

In a liquid chromatography, a sample is injected into an analysis flow path through which a mobile phase flows to be introduced to an analytical column to detect sample components separated by the analytical column with a detector (see Patent Document 1). The mobile phase flowing through the analysis flow path is manually or automatically prepared in the pH or the electrical conductivity in advance. Since the pH and the electrical conductivity of the mobile phase affect the retention time of the sample components by the analytical column, the preparation of the mobile phase must be performed accurately.

In order to confirm the preparation state of the mobile phase to be used in the analysis, in some cases, a measuring instrument, such as, e.g., a pH meter and an electric conductivity meter, is provided on the analysis flow path of the liquid chromatography. In such a case, the user measures the pH or the electrical conductivity of the mobile phase with the measuring instrument before the initiation of the analysis to determine whether or not the measured value is a predetermined value.

PRIOR ART DOCUMENT

Patent Document

Patent Document 1: Japanese Unexamined Patent Application Publication No. 2017-58148

SUMMARY OF THE INVENTION

Problems to be Solved by the Invention

As described above, in cases where a measuring instrument, such as, e.g., a pH meter and an electric conductivity meter, is provided on the analysis flow path, the mobile phase or the sample solution constantly flows through the measuring instrument. Therefore, there are problems that the inside of the measuring instrument is contaminated, resulting in abnormality of the measured results and/or quick deterioration of the measuring instrument.

When arranging the measuring instrument, it is necessary to consider the pressure resistance of the measuring instrument and the system pressure at the time of the analysis. In the liquid chromatograph, the upstream side flow path becomes in a higher-pressure state than in the analytical column of the analysis flow path. Generally, since a measuring instrument, such as, e.g., a pH meter, has poor in the pressure resistance performance, the measuring instrument cannot be arranged on the upstream side of the analytical column. For this reason, the measuring instrument is commonly arranged at the most downstream position of the analysis flow path.

However, when a measuring instrument is arranged at the most downstream position of the analysis flow path, the inner volume between the feeding unit that feeds a mobile phase and the measuring instrument increases. Therefore, it takes a long time for the mobile phase to reach the measuring instrument from the feeding unit, which prevents the quick confirmation of the preparation state of the mobile phase.

Further, in some measuring instruments, the measurement accuracy deteriorates in a state in which a mobile phase is flowing through the measuring instrument. Therefore, in order to perform the accurate measurement using such a measuring instrument, it is required to stop the feeding of the mobile phase with the feeding unit after the mobile phase has reached the measuring instrument. However, in cases where a measuring instrument is arranged at the most downstream position of an analysis flow path, it will take longer to completely stop the flow of the mobile phase in the measuring instrument due to the large volume in the system in which the flow of the mobile phase is stopped, which further slows down the confirmation of the preparation state of the mobile phase.

Accordingly, the present invention aims to enable quick confirmation of an preparation state of a mobile phase used in an analysis.

Means for Solving the Problem

A liquid chromatograph according to the present invention includes:
  a feeding unit configured to feed a mobile phase prepared for an analysis;
  an analysis flow path provided with an analytical column for separating a sample and a detector for detecting sample components separated with the analytical column;
  a sample injection part configured to inject the sample into the analysis flow path;
  a measurement flow path provided separately from the analysis flow path and provided with a measuring instrument for measuring a preparation state of the mobile phase; and
  a status switching unit configured to selectively switch between an analysis state in which all of the mobile phase from the feeding unit flows through the analysis flow path and a measurement state in which at least a part of the mobile phase from the feeding unit flows through the measurement flow path.

That is, the liquid chromatograph according to the present invention is configured such that a measurement flow path is provided separately from an analysis flow path, a measuring instrument for performing measurement of a preparation state of the mobile phase is arranged on the measurement flow path, and the mobile phase flows to the measurement flow path only when confirming the preparation state of the mobile phase. With this, the measuring instrument is detached from the analysis flow path, which can avoid the aforementioned problems due to arranging the measuring instrument on the analysis flow path.

In the case of providing a mixer for homogenizing the mobile phase on a mobile phase feeding flow path connecting between the feeding unit and the sample injection part, the status switching unit may be configured by a three-way valve provided to selectively connect the feeding unit to either an analysis flow path side or a measurement flow path side either at a position between the feeding unit and the mixer on the mobile phase feeding flow path or at a position between the mixer and the sample injection part on the mobile phase feeding flow path. In the case of providing the three-way valve as the status switching unit at the position between the feeding unit and the mixer on the mobile phase feeding flow path, the volume in the system between the feeding unit and the measuring instrument is reduced, so that the promptness of confirming the preparation state of the mobile phase is increased. On the other hand, when the three-way valve as a status switching unit is provided at a position between the mixer and the sample injection part on the mobile phase feeding flow path, the measurement of the mobile phase immediately after the homogenization with the mixer can be performed, so that the measurement accuracy of the preparation state of the mobile phase can be increased.

In the case of providing a mixer for homogenizing the mobile phase on the mobile phase feeding flow path connecting between the feeding unit and the sample injection part, the upstream end of the measurement flow path may be connected to the mobile phase feeding flow path at a position between the feeding unit and the mixer on the mobile phase feeding flow path, or at a position between the mixer on the mobile phase feeding flow path and the sample injection part. In this case, the status switching unit may be configured by the on-off valve provided at a position upstream of the measuring instrument on the measurement flow path so as to switch opening and closing of the measurement flow path. When the upstream end of the measurement flow path is connected to the position between the feeding unit and the mixer on the mobile phase feeding flow path, the capacitance in the system between the feeding unit and the measuring instrument decreases, so that the promptness of confirming the preparation state of the mobile phase is increased. On the other hand, when the upstream end of the measurement flow path is connected to the position between the mixer and the sample injection part on the mobile phase feeding flow path, the measurement of the mobile phase immediately after being homogenized by the mixer can be performed, so that the measurement accuracy of the preparation state of the mobile phase can be increased.

In the above-mentioned case, it is preferable that the measurement flow path be provided with at least one on-off valve and the at least one on-off value be provided at a position downstream of the measuring instrument. By configuring as described above, when the measurement of the preparation state of the mobile phase is performed, the flow of the mobile phase in the measuring instrument can be stopped by closing the on-off valve, so that the measurement accuracy by using the measuring instrument can be improved. Also, by closing the on-off valve provided downstream of the measuring instrument, the flow of the mobile phase in the measuring instrument can be stopped more quickly than in the case of stopping the operation of the feeding unit, so that the immediacy of confirming the preparation state of the mobile phase can be improved.

Further, as the sample injection part, an autosampler provided with at least a sampling needle having a base end side to be communicated with the feeding unit, a moving mechanism for moving the sampling needle, and an injection port to be communicated with the analysis flow path. In this case, the status switching unit can be realized using the sampling needle of the autosampler. Specifically, it is configured such that the upstream end of the measurement flow path is communicated with the measurement port for connecting the sampling needle by being inserted by the tip of the sampling needle so that the sampling needle can be connected to the measurement port. Thus, since the mobile phase from the feeding unit can be made to flow through the measurement flow path only by connecting the sampling needle to the measurement port, it is unnecessary to add a valve mechanism for realizing the status switching unit to the existing device configuration of the liquid chromatograph, so that the correlation with a normal flow path can be maintained.

Also in the above case, it is preferable that an on-off valve for switching opening and closing of the measurement flow path is provided at a position downstream of the measuring instrument on the measurement flow path. With this configuration, when the measurement of the preparation state of the mobile phase is performed, the flow of the mobile phase in the measuring instrument can be stopped by closing the on-off valve, so that the measurement accuracy using the measuring instrument can be improved. Also, by closing the on-off valve provided downstream of the measuring instrument, the flow of the mobile phase in the measuring instrument can be stopped more quickly than in the case of stopping the operation of the feeding unit, so that the immediacy of confirming the preparation state of the mobile phase can be improved.

Effects of the Invention

In the liquid chromatograph according to the present invention, it is configured such that the measurement flow path is provided separately from the analysis flow path, a measuring instrument for measuring the preparation state of the mobile phase is arranged on the measurement flow path, and the mobile phase can be made to flow through the measurement flow path only when confirming the preparation state of the mobile phase. Therefore, the volume in the system between the feeding unit and the measuring instrument becomes smaller as compared with the case in which the measuring instrument is arranged at the most downstream position of the analysis flow path while preventing the application of high pressure to the measuring instrument, and the confirmation of the preparation state of the mobile phase can be performed quickly.

EMBODIMENTS FOR CARRYING OUT THE INVENTION

Hereinafter, an embodiment of a liquid chromatograph will be described with reference to the drawings.

Figure 1:
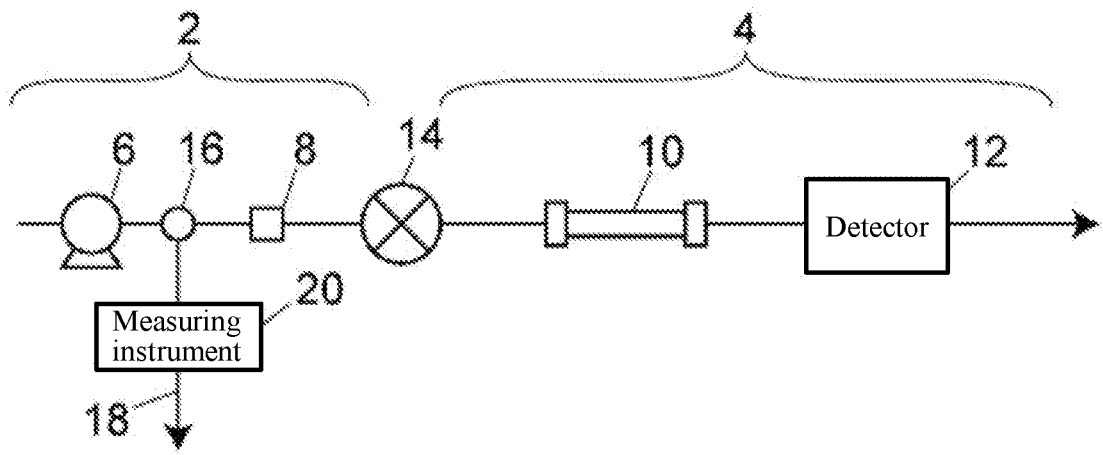
FIG. 1 is a schematic configuration diagram showing an example of a liquid chromatograph.

FIG. 1 shows an example of a liquid chromatograph.

The liquid chromatograph 1A of this example is provided with a mobile phase feeding flow path 2 having a feeding unit 6 for feeding a mobile phase and an analysis flow path 4 including an analytical column 10 for separating a sample and a detector 12 for detecting sample components separated by the analytical column 10. The downstream end of the mobile phase feeding flow path 2 and the upstream end of the analysis flow path 4 are connected to a sample injection part 14. The sample injection part 14 is an autosampler for injecting a sample into the analysis flow path 4 using the mobile phase from the mobile phase feeding flow path 2.

In this liquid chromatograph 1A, a mobile phase in which the pH or the electrical conductivity is prepared for analytical purposes is fed by the feeding unit 6 through the mobile phase feeding flow path 2 to the sample injection part 14. The sample injection part 14 injects a sample into the analysis flow path 4 using the flow of the mobile phase from the mobile phase feeding flow path 2 to the analysis flow path 4. The sample injected into the analysis flow path 4 is separated by the analytical column 10, and the separated sample components are detected by the detector 12.

A mixer 8 for homogenizing a mobile phase is provided at a position downstream of the feeding unit 6 on the mobile phase feeding flow path 2. A three-way valve 16 is provided between the feeding unit 6 and the mixer 8 on the mobile phase feeding flow path 2, and an upstream end of a measurement flow path 18 is connected to the three-way valve 16. The three-way valve 16 is configured to selectively connect the feeding unit 6 to either the further downstream side of the mobile phase feeding flow path 2, i.e., the analysis flow path 4 side or the measurement flow path 18 side. In other words, the three-way valve 16 serves as a status switching unit that selectively switches between the analysis state in which all of the mobile phase from the feeding unit 6 flows through the analysis flow path 4 and the measurement state in which at least a part of the mobile phase from the feeding unit flows through the measurement flow path 18.

A measuring instrument 20 is provided on the measurement flow path 18. As the measuring instrument 20, a pH meter for measuring a pH of liquid and an electric conductivity meter for measuring electrical conductivity of liquid can be exemplified. The measuring instrument 20 is for confirming the preparation state of the mobile phase.

The confirmation of the preparation state of the mobile phase is performed, for example, before the initiation of the sample analysis. When confirming the preparation state of the mobile phase, the three-way valve 16 is switched so that the feeding unit 6 is connected to the measurement flow path 18 side to attain a measurement state in which the mobile phase from the feeding unit 6 flows through the measurement flow path 18, and the pH and/or the electrical conductivity of the mobile phase are measured with the measuring instrument 20. With this, the preparation state of the mobile phase from the feeding unit 6 can be quickly confirmed. When the pH and/or the electrical conductivity of the mobile phase is at a predetermined value, the three-way valve 16 is switched so that the feeding unit 6 is connected to the analysis flow path 4 so that the mobile phase from the feeding unit 6 becomes an analysis state in which the mobile phase flows through the analysis flow path 4, and the analysis of the sample is started.

In cases where the measuring instrument 20 cannot perform an accurate measurement in a state in which the mobile phase is flowing, the feeding of the mobile phase by the feeding unit 6 is stopped in a state in which the mobile phase fills the inside of the cell of the measuring instrument 20 so that the state in which the mobile phase stays in the cell of the measuring instrument 20 can be maintained.

Figure 2:
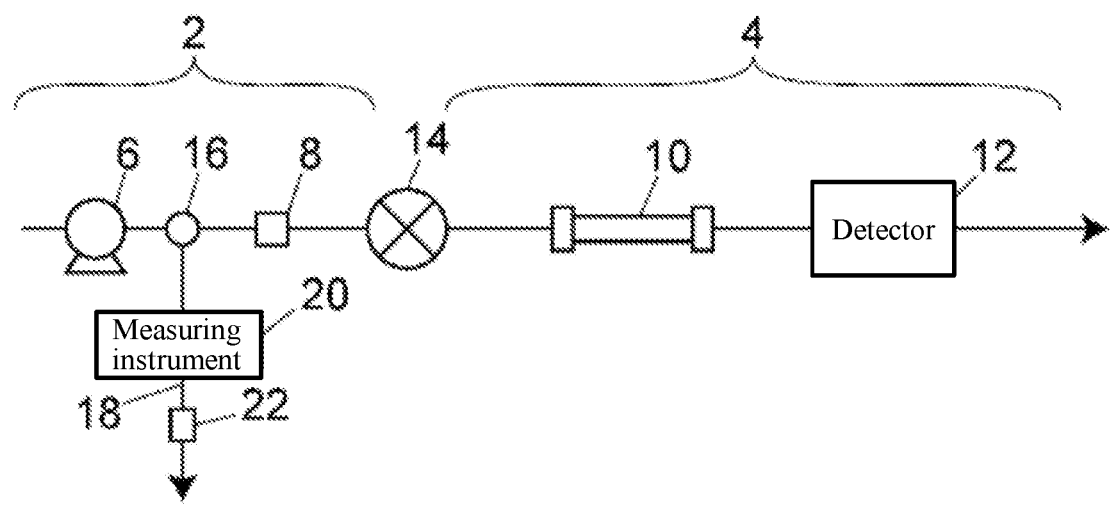
FIG. 2 is a schematic configuration diagram showing another example of a liquid chromatograph.

FIG. 2 shows a modification of the above example. In the liquid chromatograph 1B of FIG. 2, an on-off valve 22 for controlling opening and closing of the measurement flow path 18 is provided at a position downstream of the measuring instrument 20 on the measurement flow path 18. Since the on-off valve 22 is provided at this position, by closing the on-off valve 22 at the timing when the mobile phase has filled the cell of the measuring instrument 20 when confirming the preparation state of the mobile phase, the flow of the mobile phase in the cell of the measuring instrument 20 can be stopped more quickly than in the case of stopping the operation of the feeding unit 6, which improves the immediacy of confirming the preparation state of the mobile phase.

Figure 3:
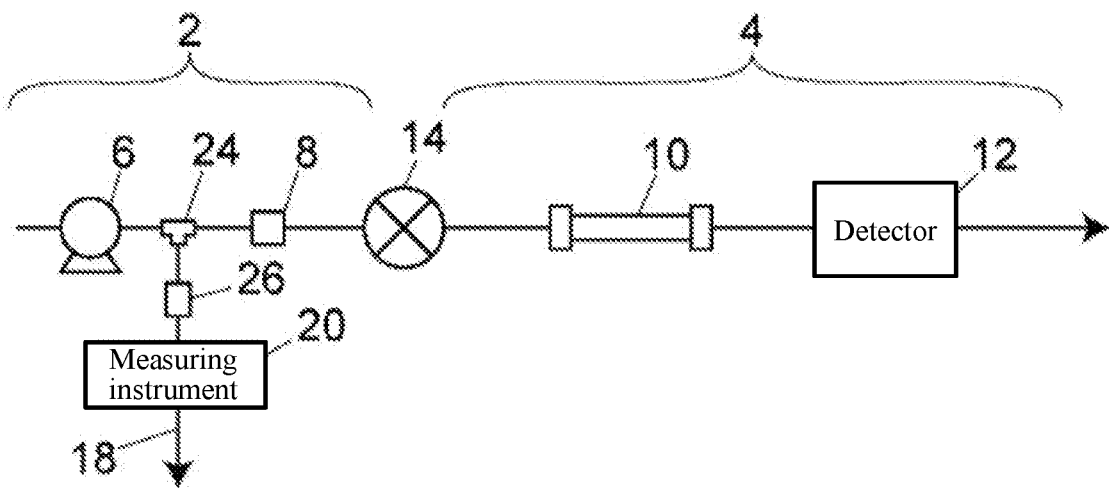
FIG. 3 is a schematic configuration diagram showing still another embodiment of a liquid chromatograph.

Also, as shown in FIG. 3, by using a three-way joint 24 in place of the three-way valve 16 of FIG. 1 and FIG. 2, the upstream end of the measurement flow path 18 may be connected to a position between the feeding unit 6 and the mixer 8 on the mobile phase feeding flow path 2. In the liquid chromatograph 1C of the example of FIG. 3, an on-off valve 26 for controlling the opening and closing of the measurement flow path 18 is provided as a status switching unit at a position upstream of the measuring instrument 20 on the measurement flow path 18. When confirming the preparation state of the mobile phase, the on-off valve 26 is opened to allow a part of the mobile phase from the feeding unit 6 to flow into the measurement flow path 18. With this, the pH and/or the electrical conductivity of the mobile phase can be measured with the measuring instrument 20.

Figure 4:
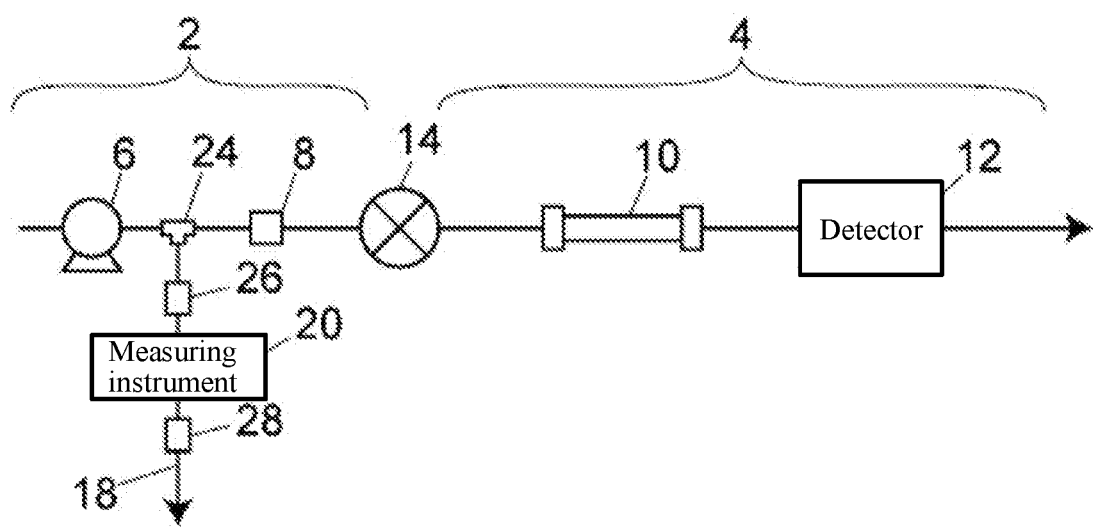
FIG. 4 is a schematic configuration diagram showing still yet another embodiment of a liquid chromatograph.

Also in this case, as in the liquid chromatograph 1D of FIG. 4, an on-off valve 28 may be provided on the measurement flow path 18 at a location downstream of the measuring instrument 20 to more quickly stop the flow of the mobile phase within the cell of the measuring instrument 20 when confirming the preparation state of the mobile phase.

Figure 5:
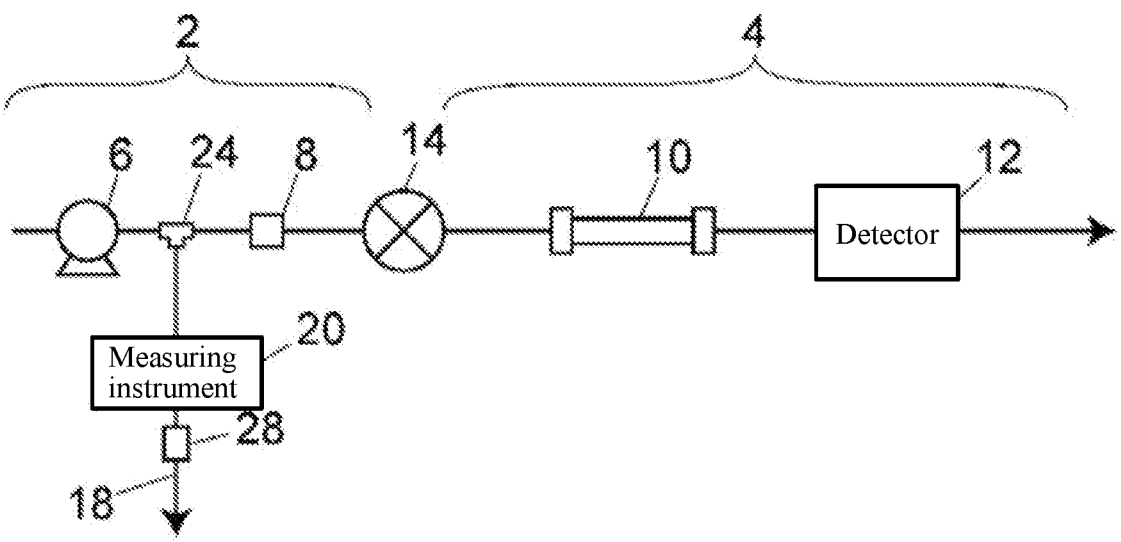
FIG. 5 is a schematic configuration diagram showing still yet another embodiment of a liquid chromatograph.

Further, as in the liquid chromatograph 1E of FIG. 5, the status switching unit of switching whether or not a part of the mobile phase from the feeding unit 6 flows to the measurement flow path 18 may be realized by only an on-off valve 28 provided downstream of the measuring instrument 20.

In any of the liquid chromatographs 1A to 1E of the above-described examples, the measurement flow path 18 is configured to be connected to the mobile phase feeding flow path 2 at a position between the feeding unit 6 and the mixer 8 on the mobile phase feeding flow path 2, but as shown in FIG. 6 to FIG. 10, the measurement flow path 18 may be configured to be connected to the mobile phase feeding flow path 2 at a position between the mixer 8 and the sample injection part 14.

Figure 6:
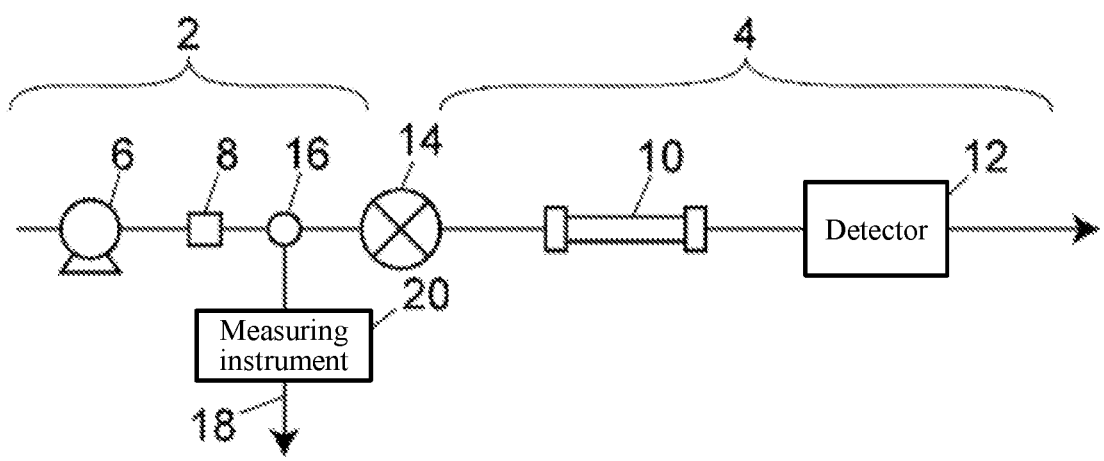
FIG. 6 is a schematic configuration diagram showing still yet another embodiment of a liquid chromatograph.
Figure 7:
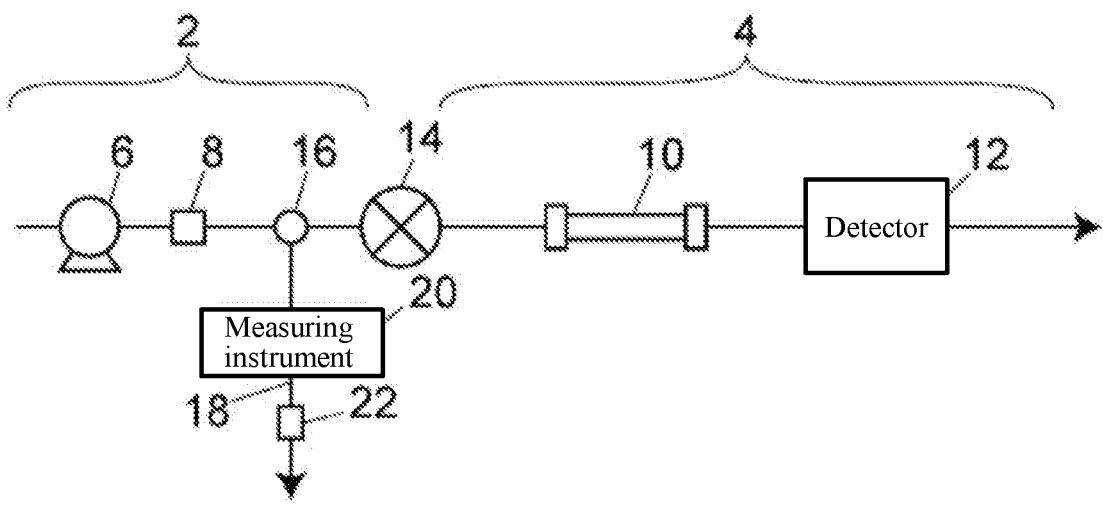
FIG. 7 is a schematic configuration diagram showing still yet another embodiment of a liquid chromatograph.
Figure 8:
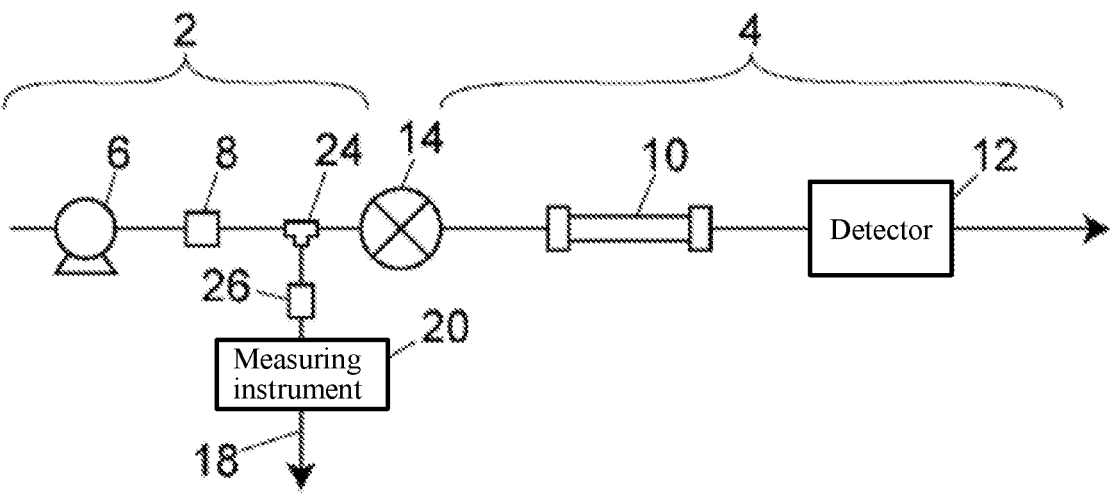
FIG. 8 is a schematic configuration diagram showing still yet another embodiment of a liquid chromatograph.
Figure 9:
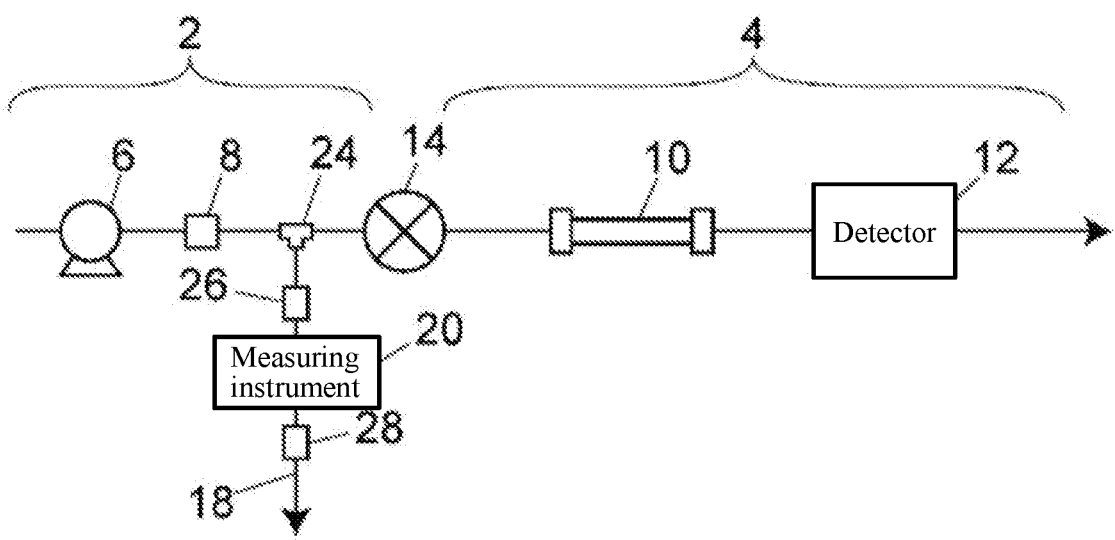
FIG. 9 is a schematic configuration diagram showing still yet another embodiment of a liquid chromatograph.
Figure 10:
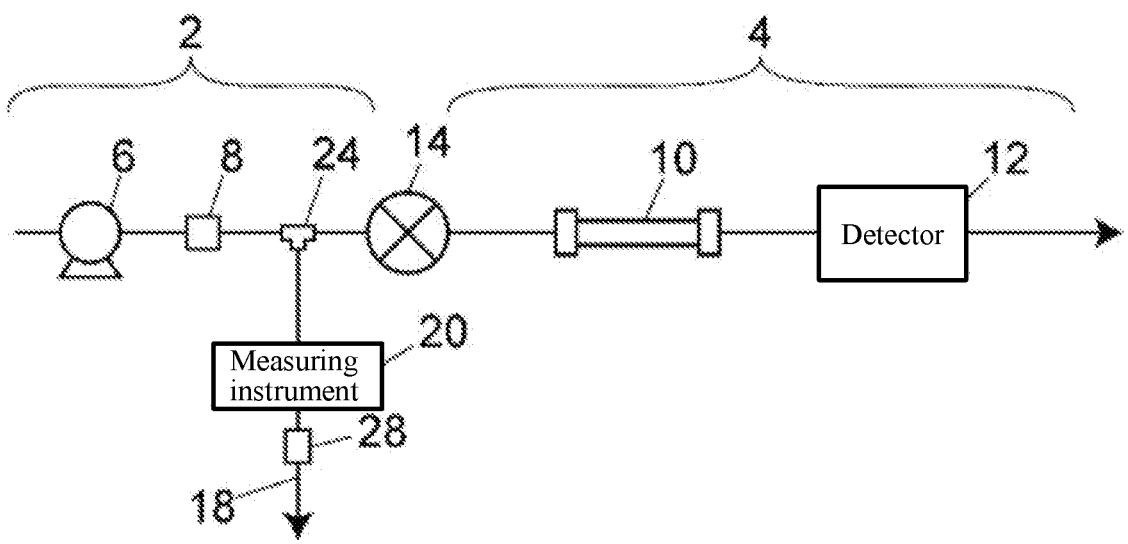
FIG. 10 is a schematic configuration diagram showing still yet another embodiment of a liquid chromatograph.

Here, the liquid chromatograph 1F of FIG. 6 corresponds to the liquid chromatograph 1A of FIG. 1, the liquid chromatograph 1G of FIG. 7 corresponds to the liquid chromatograph 1B of FIG. 2, the liquid chromatograph 1H of FIG. 8 corresponds to the liquid chromatograph 1C of FIG. 3, the liquid chromatograph 1I of FIG. 9 corresponds to the liquid chromatograph 1D of FIG. 4, and the liquid chromatograph 1J of FIG. 10 corresponds to the liquid chromatograph 1E of FIG. 5.

In the examples of the liquid chromatographs 1A to 1J of FIG. 1 to FIG. 10, the mixer 8 is provided on the mobile phase feeding flow path 2, but the mixer 8 is not necessarily provided. In short, it is sufficient to configure such that at a position upstream of the analytical column 10, at least a part of the mobile phase from the feeding unit 6 is switched to flow to the measurement flow path 18 side. This also applies to the examples of FIG. 11 to FIG. 13 described later.

The function as the status switching unit for switching between the analysis state in which all of the mobile phase from the feeding unit 6 flows through the analysis flow path 4 and the measurement state in which at least a part of the mobile phase from the feeding unit flows through the measurement flow path 18 can also be realized by a sample injection part 14. One example of a liquid chromatograph including the sample injection part 14 configured as described above is shown in FIG. 11.

Figure 11:
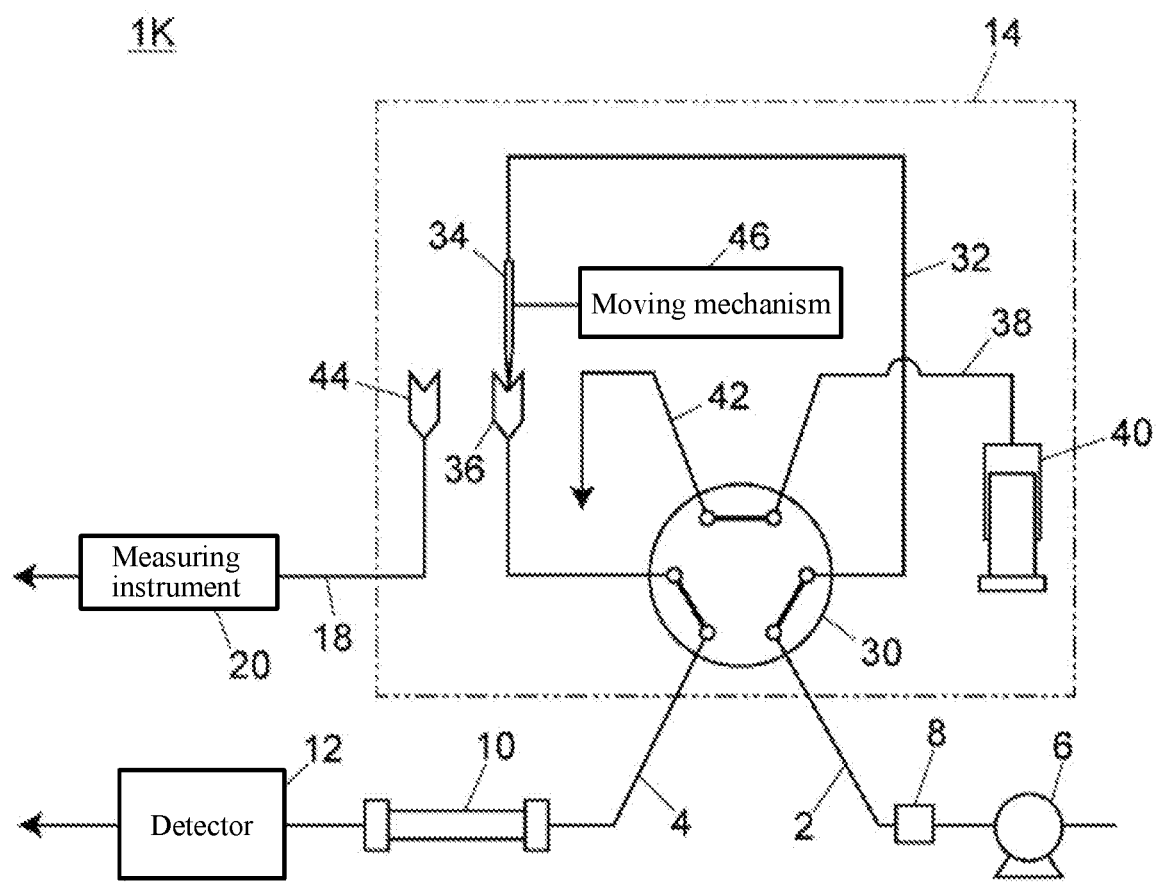
FIG. 11 is a schematic configuration diagram showing still yet another embodiment of a liquid chromatograph.

The sample injection part 14 of the liquid chromatograph 1K according to the example of FIG. 11 is configured to switch between a state in which the sampling flow path 32 holding the sample by the switching valve 30 is interposed between the mobile phase feeding flow path 2 and the analysis flow path 4 and a state in which the mobile phase feeding flow path 2 and the flow path 4 are connected without interposing the sampling flow path 32. The switching valve 30 is a multi-port valve having six connecting ports.

One of the ports provided in the switching valve 30 is an injection port 36 for inserting the tip of the sampling needle 34 provided at the tip of the sampling flow path 32 to connect the sampling flow path 32. Connected to the other ports of the switching valve 30 are the analysis flow path 4, the mobile phase feeding flow path 2, the sampling flow path 32, the syringe flow path 38, and the drain flow path 42. The syringe flow path 38 communicates with the suction/discharge port of the syringe pump 40, and the drain flow path 42 communicates with a drain flow path 42.

The sampling needle 34 is configured to be movable to a desired position by a moving mechanism 46. A measurement port 44 is provided within the travel range of the sampling needle 34. Similar to the injection port 36, the measurement port 44 is used to connect the sampling flow path 32 by inserting the tip of the sampling needle 34. The measurement port 44 is provided at the upstream end of the measurement flow path 18 to allow the sampling flow path 32 to communicate with the measurement flow path 18 by inserting the tip of the sampling needle 34 into the measurement port 44.

Figure 12:
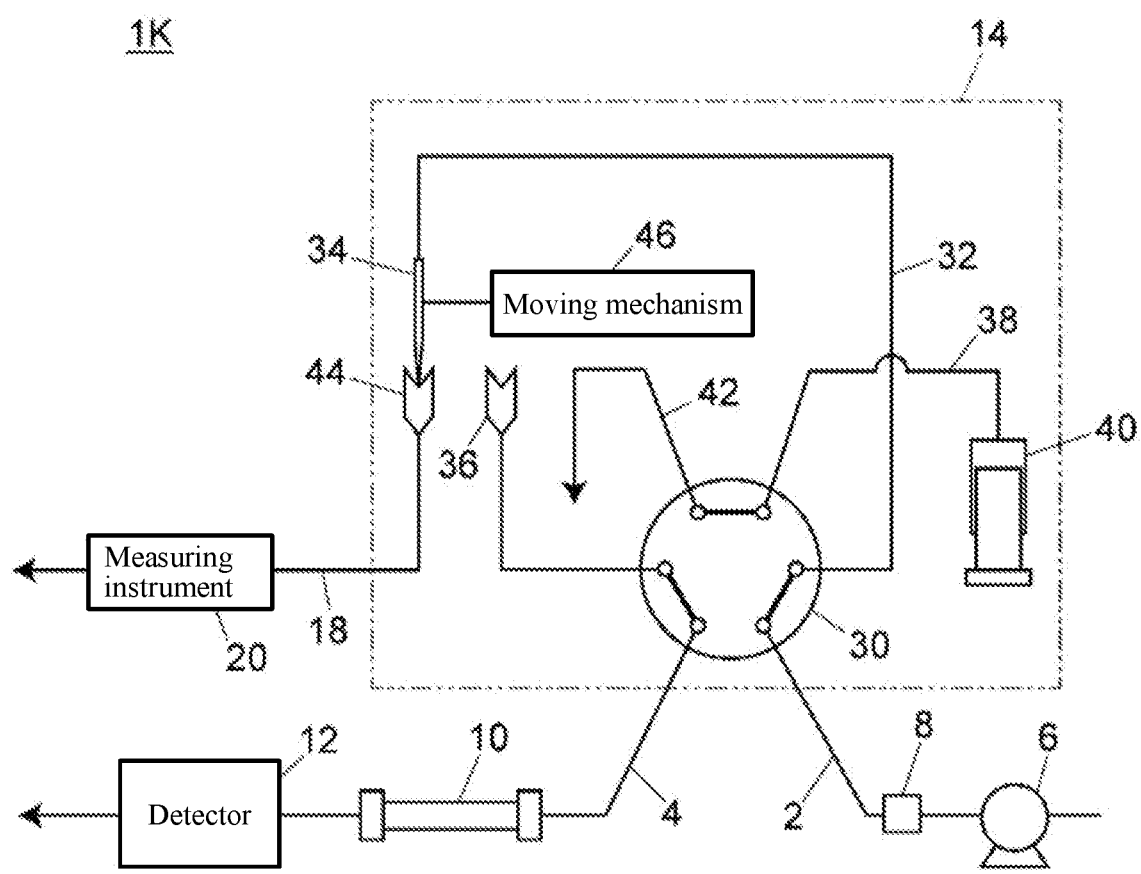
FIG. 12 is a diagram showing the state of the example at the time of measuring a mobile phase.

In the liquid chromatograph 1K of this example, as shown in FIG. 12, the sampling flow path 32 is communicated with the measurement flow path 18 by inserting the tip of the sampling needle 34 into the measurement port 44 to introduce the mobile phase from the feeding unit 6 into the measuring instrument 20 through the mobile phase feeding flow path 2, the sampling flow path 32, the measurement port 44, and the measurement flow path 18 to confirm the preparation state of the mobile phase.

In cases where the measuring instrument 20 cannot perform accurate measurements in a state in which the mobile phase is flowing, it is required to maintain the state in which the mobile phase stays in the cell of the measuring instrument 20 by stopping the feeding of the mobile phase with the feeding unit 6 in a state in which the tip of the sampling needle 34 is inserted into the measurement port 44.

Figure 13:
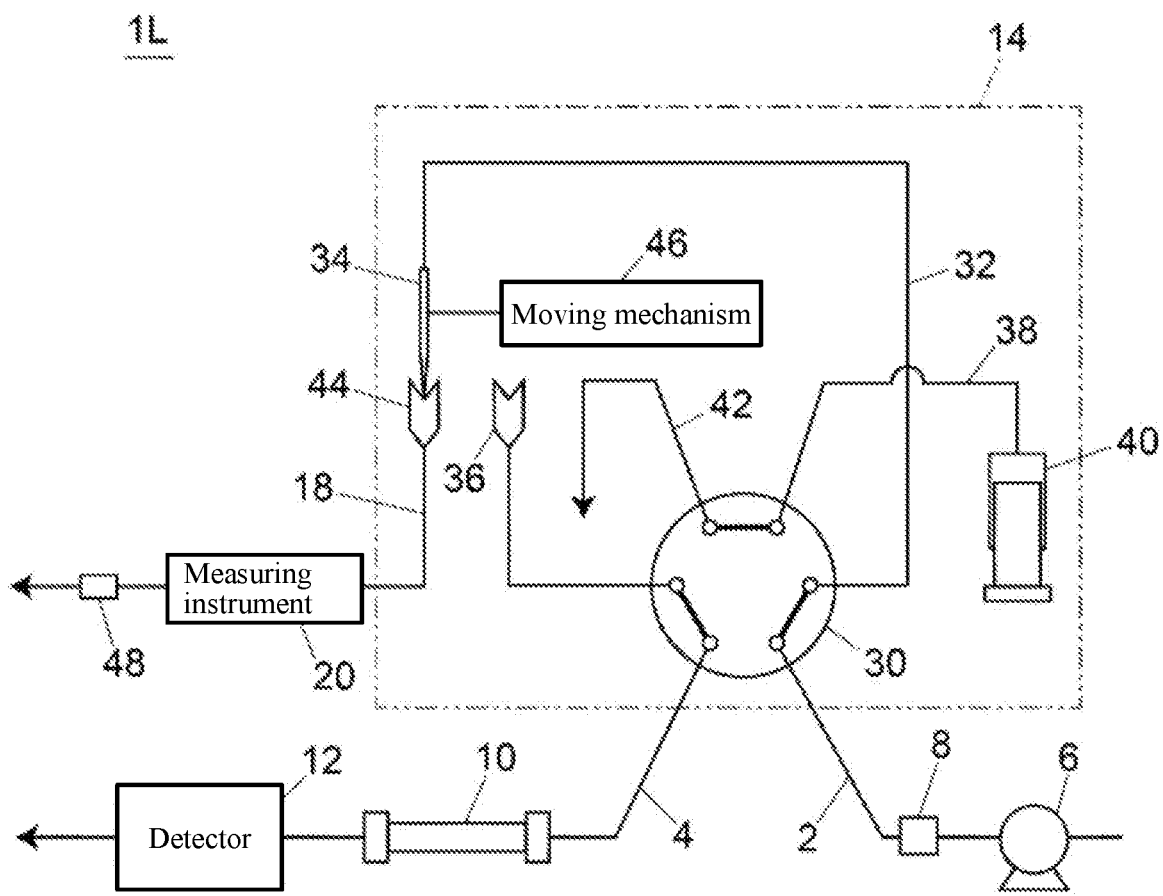
FIG. 13 is a schematic configuration diagram showing still yet another embodiment of a liquid chromatograph.

Further, as in the liquid chromatograph 1L of FIG. 13, an on-off valve 48 may be provided on the measurement flow path 18 at a position downstream of the measuring instrument 20. By closing the on-off valve 48 when the mobile phase fills the cell of the measuring instrument 20, thereafter, even if the sampling needle 34 is moved from the measurement port 44 to another position, it is possible to maintain the state in which the mobile phase stays in the cell of the measuring instrument 20. This enables another processing by moving the sampling needle 34 to another position while the measuring instrument 20 is measuring the mobile phase.

In any of the examples of the liquid chromatographs 1A to 1L described above, the measurement flow path 18 having the measuring instrument 20 is provided separately from the mobile phase feeding flow path 2 and the analysis flow path 4 so that the mobile phase does not flow through the measurement flow path 18 during the analysis. Therefore, even if the system pressure at the time of the analysis is not applied to the measuring instrument 20 and the pressure resistance is less than the system pressure at the time of the analysis using the liquid chromatograph, the measuring instrument 20 can be used without problems. Further, since the sample does not flow to the measuring instrument 20, the deterioration of the measuring performance due to the contamination of the measuring instrument 20 can be suppressed.

Furthermore, since the mobile phase is configured to flow to the measuring instrument 20 without passing through the analytical column 10 when measuring the pH or the electrical conductivity of the mobile phase, the time required for the mobile phase to reach the measuring instrument 20 is greatly shortened, and the instantaneity of the mobile phase measurement is improved, as compared with the case in which the measuring instrument 20 is provided at the most downstream portion of the analysis flow path 4.

DESCRIPTION OF SYMBOLS 1A to 1L: Liquid chromatograph
2: Mobile phase feeding flow path
4: Analysis flow path
6: Feeding unit
8: Mixer
10: Analytical column
12: Detector
14: Sample injection part
16: Three-way valve
18: Measurement flow path
20: Measuring instrument
22,26,28,48: On-off valve
24: Three-way joint
30: Switching valve
32: Sampling flow path
34: Sampling needle
36: Injection port
38: Syringe flow path
40: Syringe pump
42: Drain flow path
44: Measurement port
46: Moving mechanism

The invention claimed is:
1. A liquid chromatograph comprising:
a feeding unit configured to feed a mobile phase prepared for an analysis;

an analysis flow path provided with an analytical column for separating a sample and a detector for detecting sample components separated with the analytical column;

a sample injection part configured to inject the sample into the analysis flow path;

a measurement flow path provided separately from the analysis flow path and provided with a measuring instrument for measuring a preparation state of the mobile phase; and a status switching unit disposed between the feeding unit and the measurement instrument, the status switching unit configured to selectively switch between an analysis state in which all of the mobile phase from the feeding unit flows through the analysis flow path and a measurement state in which at least a part of the mobile phase from the feeding unit flows through the measurement flow path.

2. The liquid chromatograph as recited in claim 1, further comprising:

a mixer configured to homogenize the mobile phase, the mixer being provided on a mobile phase feeding flow path connecting between the feeding unit and the sample injection part, wherein the status switching unit is configured by a three-way valve provided to selectively connect the feeding unit to either an analysis flow path side or a measurement flow path side at a position between the feeding unit and the mixer on the mobile phase feeding flow path.

3. The liquid chromatograph as recited in claim 1, further comprising:

a mixer configured to homogenize the mobile phase, the mixer being provided on a mobile phase feeding flow path connecting between the feeding unit and the sample injection part, wherein the status switching unit is configured by a three-way valve provided to selectively connect the feeding unit to either an analysis flow path side or a measurement flow path side at a position between the mixer on the mobile phase feeding flow path and the sample injection part.

4. The liquid chromatograph as recited in claim 1, further comprising:

a mixer configured to homogenize the mobile phase, the mixer being provided on a mobile phase feeding flow path connecting between the feeding unit and the sample injection part, wherein an upstream end of the measurement flow path is connected to the mobile phase feeding flow path at a position between the feeding unit and the mixer on the mobile phase feeding flow path, and wherein the status switching unit is constituted by an on-off valve provided on the mobile phase feeding flow path so as to switch opening and closing of the measurement flow path.

5. The liquid chromatograph as recited in claim 1, further comprising:

a mixer configured to homogenize the mobile phase, the mixer being provided on a mobile phase feeding flow path connecting between the feeding unit and the sample injection part, wherein an upstream end of the measurement flow path is connected to the mobile phase feeding flow path at a position between the mixer on the mobile phase feeding flow path and the sample injection part, and wherein the status switching unit is constituted by an on-off valve provided on the measurement flow path so as to switch opening and closing of the measurement flow path.

6. The liquid chromatograph as recited in claim 4, wherein the measurement flow path is provided with at least one on-off valve, and the at least one on-off valve is provided at a position downstream of the measuring instrument.

7. The liquid chromatograph as recited in claim 1, wherein the sample injection part is provided with at least a sampling needle having a base end side configured to be communicated with the feeding unit, a moving mechanism configured to move the sampling needle, and an injection port configured to be communicated with the analysis flow path, wherein an upstream end of the measurement flow path is communicated with a measurement port for connecting the sampling needle by being inserted by a tip of the sampling needle, and wherein the sample injection part is configured to connect the sampling needle to the measurement port and serves a function as the status switching unit.

8. The liquid chromatograph as recited in claim 7, wherein the measurement flow path is provided with an on-off valve for switching opening and closing of the measurement flow path at a position downstream of the measuring instrument.

9. The liquid chromatograph as recited in claim 5, wherein the measurement flow path is provided with at least one on-off valve, and the at least one on-off valve is provided at a position downstream of the measuring instrument.

* * * * *